Patented July 3, 1945

2,379,759

UNITED STATES PATENT OFFICE 2,379,759

CHLORINATION OF ALIPHATIC ACIDS AND ESTERS

Le Roy U. Spence, Elkins Park, Pa., and Fritz O. Haas, Washington, D. C., assignors to Röhm & Haas Company, Philadelphia, Pa., a corporation of Delaware No Drawing. Application May 26, 1942, Serial No. 444,524

6 Claims. (Cl. 260—487)

This invention concerns the chlorination of aliphatic acids and esters of such acids, in the vapor phase.

An object of the invention is to effect chlorination of compounds of the type mentioned above, in a rapid and efficient manner. Another object is to provide an improved method for producing chlorinated aliphatic acids and esters of such acids. Still another object is to provide a method that is capable of continuous operation in place of batch methods such as have been employed heretofore. A further object is to eliminate the necessity of having to use catalysts in the preparation of chlorinated compounds of the type aforesaid.

In accordance with our invention, a mixture of the organic acid, for example, in the vapor phase and chlorine is prepared at a temperature at which no substantial reaction takes place, e. g. at temperatures of from about 100° to about 200° C. The mixture so prepared is passed through a reaction zone heated to a temperature within the range of from about 250° to about 500° C. The mixture is permitted to remain in the reaction zone for a period of time sufficient to cause substantially all of the chlorine to react with the acid. An excess of acid over the amount which will theoretically combine with the chlorine is preferably used in order to give better control and to prevent decomposition or inflammation of the mixture. The acid which remains unchanged may be separated and returned to the process for further chlorination. Catalysts have been found to be unnecessary. Their presence in the reaction zone usually promotes undesirable decomposition of the chlorinated products. Furthermore, chlorination under the conditions above set forth is very rapid so that catalytic acceleration of the reaction is not necessary.

Contact times in the reaction zone of the order of from 1 to 30 seconds are usually sufficient to effect complete reaction of the chlorine with the compound with which it is to react. After passage through the reaction zone, separation of the chlorinated product from other materials admixed therewith may be accomplished by any convenient method, such as by distillation, crystallization, etc. The method of separation may be varied depending upon the nature of the products.

Compounds which may be chlorinated by the method herein disclosed include saturated aliphatic acids, such as acetic, propionic, isobutyric, n-butyric, valeric, caproic, heptoic, caprylic, nonylic and capric, and esters of such acids and saturated aliphatic alcohols, in which ester the total number of carbon atoms is 3 to 12 inclusive such as methyl acetate, ethyl propionate, propyl butyrate, butyl valerate, etc. Such compounds are volatile at temperatures below those at which the reaction of chlorine therewith is carried out in accordance with our invention.

Typical results attained by following the procedure above set forth are given in the table below:

| Compound chlorinated | Temp. | Contact time | Ratio compound Cl₂ | Per cent compound used up | Yield on compound used up | | | Total monochloro compound |
|---|---|---|---|---|---|---|---|---|
| | | | | | α | β | γ | |
| | °C. | Seconds | | | | | | |
| Acetic acid | 470 | 9.3 | 3.5 | 21 | 52 | ---- | ---- | 52 |
| Propionic acid | 400 | 5.8 | 3.4 | 28 | 32 | (54) | ---- | 86 |
| Isobutyric acid | 345 | 11.2 | 3.2 | 29 | 22 | 59 | ---- | 81 |
| n-Butyric acid | 365 | 10.8 | 3.3 | 28 | 6 | 57 | 10 | 73 |
| Methyl propionate | 370 | 10.8 | 3.6 | 30 | (24) | 43 | ---- | 67 |
| Methyl isobutyrate | 290 | 12.4 | 3.3 | 29 | (20) | 66 | ---- | 86 |

Data in the above table were obtained by separately passing chlorine and acid or ester in known amounts into a vaporizer wherein the vaporized acid or ester was mixed with the chlorine in a high velocity zone at a temperature slightly above the boiling point of the former. The acid or ester was supplied in a ratio of from 2 to 8 mols per mol of chlorine. The mixture was then passed through a heated Pyrex tube maintained at a temperature as noted in the table with respect to each of the compounds and at a rate such that the chlorine was completely reacted with the compound before the reaction mixture left the tube. The reaction products were thereafter collected, separated, and identified as to amount and kind.

As will be observed from the table, substantial yields of the mono-chloro compounds were obtained.

We claim:

1. The process of preparing in preponderant amounts the monochloro derivatives of a compound from the group consisting of saturated aliphatic acids having from two to ten carbon atoms and esters of such acids and saturated aliphatic alcohols having a total of three to twelve carbon atoms, which comprises heating one mol of chlorine and between about two and about eight mols of the vapors of said compound to be chlorinated in a reaction zone, in the absence of a catalyst, at a temperature between about 250° C. and about 500° C. for a period of time from about one second to about thirty seconds.

2. The process of producing in preponderant amounts the monochloro derivatives of saturated aliphatic acids having a total of two to ten carbon atoms, which comprises heating one mol of chlorine and between about two and about eight mols of the vapors of said acid to be chlorinated in a reaction zone, in the absence of a catalyst, at a temperature between about 250° C. and about 500° C. for a period of time between about one second and about thirty seconds.

3. The process of producing in preponderant amounts the monochloro derivatives of esters of saturated aliphatic acids and saturated aliphatic alcohols, said esters having a total of three to twelve carbon atoms, which comprises heating one mol of chlorine and between about two and about eight mols of the vapors of said ester to be chlorinated in a reaction zone, in the absence of a catalyst, at a temperature between about 250° C. and about 500° C. for a period of time between about one second and about thirty seconds.

4. The process of producing monochloroacetic acid which comprises heating one mol of chlorine and between two and about eight mols of the vapors of acetic acid in a reaction zone, in the absence of a catalyst, at a temperature between about 250° C. and 500° C. for a period of time between about one second and about thirty seconds.

5. The process of producing α- and β-monochloropropionic acid in preponderant amounts which comprises heating one mol of chlorine and between two and eight mols of propionic acid, in the absence of a catalyst, in a reaction zone at a temperature of between about 250° C. and about 500° C. for a period of time between about one second and about thirty seconds.

6. The process of producing the monochloro derivatives of methyl isobutyrate in preponderant amounts which comprises heating one mol of chlorine and between about two and about eight mols of methyl isobutyrate, in the absence of a catalyst, in a reaction zone maintained at a temperature between about 250° C. and about 500° C. for a period of time between about one second and about thirty seconds.

LE ROY U. SPENCE.
FRITZ O. HAAS.